United States Patent
Naoi

(10) Patent No.: US 7,530,001 B2
(45) Date of Patent: May 5, 2009

(54) WIRELESS COMMUNICATIONS SYSTEM REDUCING UNNECESSARY RETRANSMISSION BY MEANS OF A CORRELATION VALUE OF RECEIVED DATA WITH PREAMBLE AND A METHOD THEREFOR

(75) Inventor: Toshimichi Naoi, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 542 days.

(21) Appl. No.: 11/328,256

(22) Filed: Jan. 10, 2006

(65) Prior Publication Data
US 2006/0156203 A1 Jul. 13, 2006

(30) Foreign Application Priority Data
Jan. 13, 2005 (JP) ............................. 2005-005943

(51) Int. Cl.
G08C 25/02 (2006.01)
(52) U.S. Cl. ....................... 714/748; 714/749; 714/750; 714/751; 714/707
(58) Field of Classification Search ......... 714/748–751, 714/704, 776
See application file for complete search history.

(56) References Cited

U.S. PATENT DOCUMENTS

| 4,584,685 | A | * | 4/1986 | Gajjar | 714/751 |
| 5,968,197 | A | * | 10/1999 | Doiron | 714/748 |
| 6,163,861 | A | * | 12/2000 | Yoshioka et al. | 714/712 |
| 6,392,933 | B1 | * | 5/2002 | Yoshida | 365/185.29 |
| 6,425,105 | B1 | * | 7/2002 | Piirainen et al. | 714/748 |
| 6,731,624 | B1 | * | 5/2004 | Maekawa et al. | 370/350 |
| 6,938,195 | B1 | * | 8/2005 | Shi et al. | 714/748 |
| 7,054,298 | B1 | * | 5/2006 | Kim et al. | 370/342 |

FOREIGN PATENT DOCUMENTS

JP 2002-026984 1/2002

* cited by examiner

Primary Examiner—Esaw T Abraham
(74) Attorney, Agent, or Firm—Studebaker & Brackett PC; Donald R. Studebaker

(57) ABSTRACT

Packet data consist of preamble information, header information, transmitting information and an error detection code arranged in the order are generated to be transmitted to wireless communications apparatus. When data transmitted from the wireless communications apparatus are received, it is determined whether or not a correlation value of the received data with predetermined preamble information is equal to or larger than a predetermined threshold. When the correlation value is equal to or larger than the threshold, then it is determined whether or not there are next header information and transmitting information to be transmitted. Finally, next packet data based on the next header information and transmitting information are transmitted. Packet data will not be retransmitted even when bit error exists in a response signal, thus making it possible to improve the transmission efficiency.

4 Claims, 9 Drawing Sheets

Fig. 3A
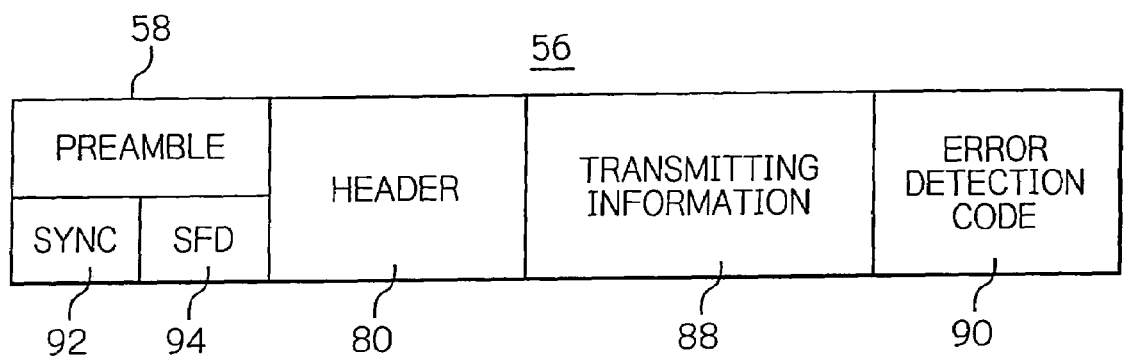
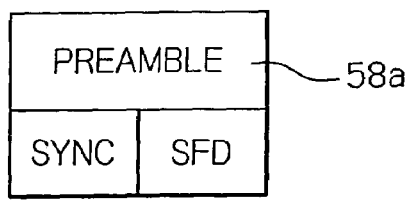
Fig. 3B

WIRELESS COMMUNICATIONS SYSTEM REDUCING UNNECESSARY RETRANSMISSION BY MEANS OF A CORRELATION VALUE OF RECEIVED DATA WITH PREAMBLE AND A METHOD THEREFOR

BACKGROUND OF THE INVENTION

1. Field of the Invention

The present invention relates to a wireless communications system, especially to a wireless communications system for bit-error-free packet transmission. The invention also relates to a method for such wireless communications.

2. Description of the Background Art

Since the packet transmission carried out between digital devices such as computers, etc., in the form of units of bit streams does not permit any bit error to occur, bit-error-free packet transmission is generally employed.

In the packet transmission, bit-error-free transmission is realized by means of a communication protocol named handshaking. The handshaking proceeds in the following manner. A data transmitter, or sender, adds an error detection code to packet data, and then sends out the packet data. A data receiver uses the error detection code to detect any bit error in the received packet data. When the data receiver detects no error in the packet data, it sends out a response signal named ACK (ACKnowledgement) packet. When the data receiver detects any error, it cancels the received packet data and waits. When the data sender receives the response signal from the data receiver within a preset period of time, the data sender will proceed to resending the packet data in question.

As a system to implement bit-error-free packet transmission, Japanese patent laid-open publication No. 2002-26984 discloses a communications system in which, in order to reduce the error rate in ACK packets, the data field of an ACK packet is used for the indication of a response signal to reduce the number of bits required for the ACK packet and the ACK packet is sent out in the form of including an error detection code.

In a communications system disclosed in above-mentioned patent document, however, there is a problem that, if a data receiver received packet data without any bit error and sent out an ACK packet to a data sender, and thereafter the data sender detects error in the received ACK packet based on its error detection code included in the ACK packet, then the data sender fails to confirm the ACK packet, and consequently determines that it has received no ACK packet within a preset period of time to resend out the packet data in question, as would be unnecessary, thus deteriorating transmission efficiency.

SUMMARY OF THE INVENTION

It is an object of the present invention to provide a wireless communications system and a method therefor in which an unnecessary retransmission of packet data is avoided, even when a response signal includes a bit error, to thereby improve the transmission efficiency.

Wireless communications apparatus according to an aspect of the present invention comprises a transmitter/receiver for transmitting packet data to another wireless communications apparatus and receiving data transmitted from the other wireless communications apparatus, a determination circuit for calculating a correlation value of the data received by the transmitter/receiver with predetermined information and determining whether or not the correlation value is equal to or larger than a threshold value, and a controller for controlling the transmitter/receiver to transmit the packet data when the determination circuit fails to determine that the correlation value is equal to or larger than the threshold value in a predetermined period of time after having transmitted the packet data.

In the wireless communications apparatus according to the aspect of the invention, the transmitter/receiver transmits packet data to the other wireless communications apparatus and receives data transmitted from the other wireless communications apparatus. The determination circuit calculates a correlation value of the data received by the transmitter/receiver with the predetermined information, and determines whether or not the correlation value is equal to or larger than a threshold value. The controller controls the transmitter/receiver to retransmit the packet data when the determination circuit fails to determine that the correlation value is equal to or larger than the threshold value in the predetermined period of time after having transmitted the packet data.

Therefore, packet data are retransmitted only when the correlation value of the received data with the predetermined information does not exceed the threshold value. Packet data are not retransmitted when the correlation value of the received data with the predetermined response signal is equal to or larger than the threshold value even though the received data are of a response signal having bit error. It is therefore possible to control unnecessary retransmission and improve the transmission efficiency.

Wireless communications apparatus according to another aspect of the invention comprises a transmitter/receiver for transmitting packet data including either preamble information and an error detection code or only the preamble information to another wireless communications apparatus and receiving data transmitted from the other wireless communications apparatus, a determination circuit for calculating a correlation value of the data received by the transmitter/receiver with predetermined preamble information and determining whether or not the correlation value is equal to or larger than a threshold value, and a controller for controlling the transmitter/receiver to retransmit the packet data including the preamble information and an error detection code when the determination circuit fails to determine that the correlation value is equal to or larger than the threshold value in the predetermined period of time after having transmitted the packet data including the preamble information and the error detection code.

In the wireless communications apparatus according to that aspect of the invention, the transmitter/receiver transmits packet data including either the preamble information and the error detection code or only the preamble information to the other wireless communications apparatus, and receives data transmitted from the other wireless communications apparatus. The determination circuit calculates the correlation value of the data received by the transmitter/receiver with the predetermined preamble information, and determines whether or not the correlation value is equal to or larger than a threshold value. The controller controls the transmitter/receiver to retransmit the packet data including the preamble information and the error detection code when the determination circuit fails to determine that the correlation value is equal to or larger than the threshold value in the predetermined period of time after having transmitted the packet data including preamble information and the error detection code.

Therefore, packet data are retransmitted only when the correlation value of the received data with the predetermined preamble information is not equal to or larger than the threshold value. Packet data are not retransmitted when the correlation value of the received data with the predetermined preamble signal is equal to or larger than the threshold value even though the received data are of a response signal consisting of preamble information having bit error. It is therefore possible to control unnecessary retransmission and improve the transmission efficiency.

Further, the wireless communications apparatus according to the other aspect of the invention comprises an error detector for detecting error on the basis of an error detection code when the determination circuit determines that the correlation value is equal to or larger than a threshold value and the packet data includes an error detection code. In this case, the controller can control the transmitter/receiver to transmit packet data only consisting of the preamble information as a response signal when no error is detected by the error detector. Thus, as a response signal, packet data are transmitted which only consist of the preamble information, it is possible to reduce the number of bits required for a response signal.

The wireless communications system according to a further aspect of the invention includes a plurality of wireless communications apparatus according to the other aspect of the invention stated above.

A wireless communications apparatus according to a still further aspect of the invention comprises an inverter for inverting data bits, a transmitter/receiver for transmitting packet data including either preamble information and an error detection code or only information resultant from inverting the preamble information by the inverter to another wireless communications apparatus and receiving data transmitted from the other wireless communications apparatus, a selector for selecting either data resultant from inverting the received data by the inverter or the received data not inverted, a determination circuit for calculating a correlation value of the data selected by the selector with predetermined preamble information and determining whether or not the correlation value is equal to or larger than a threshold value, and a controller for controlling the selector to select the inverted data after having transmitted the packet data including the preamble information and the error detection code. The controller controls the transmitter/receiver to retransmit the packet data including the preamble information and the error detection code when the determination circuit fails to determine that the correlation value is equal to or larger than the threshold value in the predetermined period of time after having transmitted the packet data. The controller further controls the selector to select the data not inverted after the determination circuit determines that the correlation value is equal to or larger than the threshold value.

In the wireless communications apparatus according to that aspect of the invention described above, the transmitter/receiver transmits packet data including either the preamble information and the error detection code or only the information resultant from inverting the preamble information by the inverter to the other wireless communications apparatus, and receives data transmitted from the other wireless communications apparatus. The selector selects either the received data inverted by the inverter or the received data not inverted. The determination circuit calculates a correlation value of the data selected by the selector with the predetermined preamble information, and determines whether or not the correlation value is equal to or larger than the threshold value. The controller controls the selector to select the data inverted after having transmitted the packet data including the preamble information and the error detection code. The controller controls the transmitter/receiver to retransmit the packet data including the preamble information and the error detection code when the determination circuit fails to determine that the correlation value is equal to or larger than the threshold value in the predetermined period of time after having transmitted the packet data. The controller further controls the selector to select the data not inverted after the determination circuit determines that the correlation value is equal to or larger than the threshold value.

Thus, packet data are retransmitted only when the correlation value of the received data which have the data bits thereof inverted and the predetermined preamble information is not equal to or larger than the threshold value. Packet data are not retransmitted when the correlation value of the received data which have the data bits thereof inverted and the predetermined preamble signal is equal to or larger than the threshold value even though the received data are of a response signal having bit error and consisting of inverted preamble information. It is therefore possible to control unnecessary retransmission and improve the transmission efficiency. Further, even when there exist packet data including preamble information together with packet data consisting of only the information resultant from inverting the preamble information in its data bits, mixing with each other, it is possible to determine which the response signal is.

Further, the wireless communications apparatus according to the still further aspect of the invention described above comprises the error detector for detecting error on the basis of the error detection code when the determination circuit determines that the correlation value is equal to or larger than the threshold value and the packet data includes the error detection code. In this case, the controller can control the transmitter/receiver to retransmit packet data consisting of only the information resultant from inverting the preamble information the inverter as a response signal when no error is detected by the error detector. Thus, without increasing the number of bits required for a response signal, it is possible to determine whether or not the packet data are of a response signal based on the preamble information of the received packet data.

A wireless communications system according to a further aspect of the invention includes a plurality of wireless communications apparatus according to the still further aspect of the invention described above.

A method for wireless communications according to an aspect of the present invention comprises the steps of transmitting packet data to wireless communications apparatus, receiving data transmitted from the wireless communications apparatus, calculating a correlation value of the received data with predetermined information, determining whether or not the correlation value is equal to or larger than a threshold value, and retransmitting the packet data when it is not determined that the correlation value is equal to or larger than a threshold value in the predetermined period of time after having transmitted the packet data.

As described above, the wireless communications apparatus, the wireless communications system and the wireless communications method according to the present invention involve the advantages that packet data are retransmitted only when the correlation value of received data with predetermined information is not equal to or larger than a threshold value and packet data are not retransmitted when the correlation value of the received data with the predetermined information is equal to or larger than the threshold value even though the received data are of a response signal having bit error and it is therefore possible to control unnecessary retransmission and improve the transmission efficiency.

BRIEF DESCRIPTION OF THE DRAWINGS

The objects and features of the present invention will become more apparent from consideration of the following detailed description taken in conjunction with the accompanying drawings in which:

FIGS. 3A and 3B show a packet data format and a response signal format, respectively, used in the illustrative embodiment;

DESCRIPTION OF THE PREFERRED EMBODIMENTS

Figure 1:
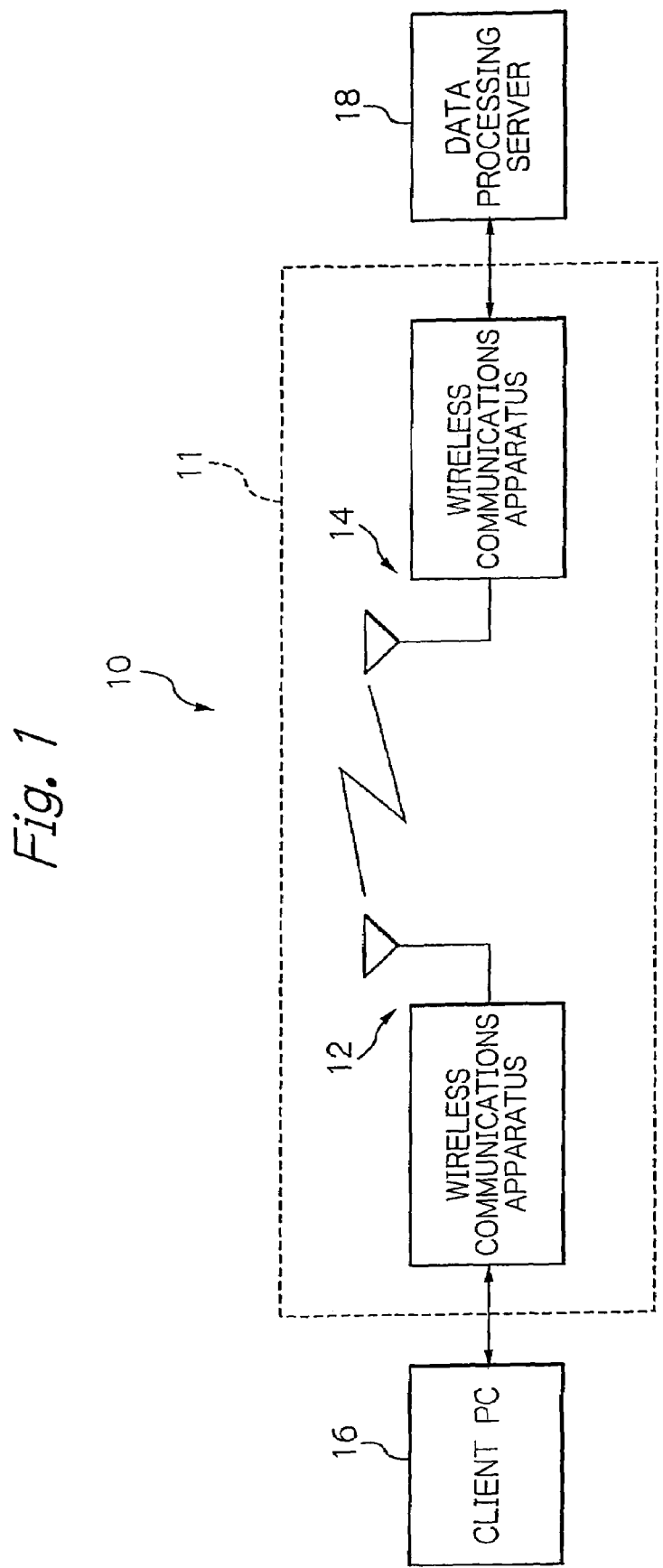
FIG. 1 is a schematic block diagram showing the configuration of a wireless communications system according to an embodiment of the invention.

With reference to FIG. 1, a data communications system 10 is composed of a wireless communications system 11 according to the illustrative embodiment that carries out wireless data communication, a client personal computer (PC) 16 and a data processing server 18. The wireless communications system 11 is composed of wireless communications apparatus 12 and 14, which are implemented by wireless LAN (Local Area Network) PC cards or routers, etc., adapted to transmit and receive data. The specific system 10 is merely illustrative. In practice, however, the system 10 may of course be structured to include a lot of personal computers and servers corresponding to the client personal computer 16 and the data processing server 18.

Figure 2:
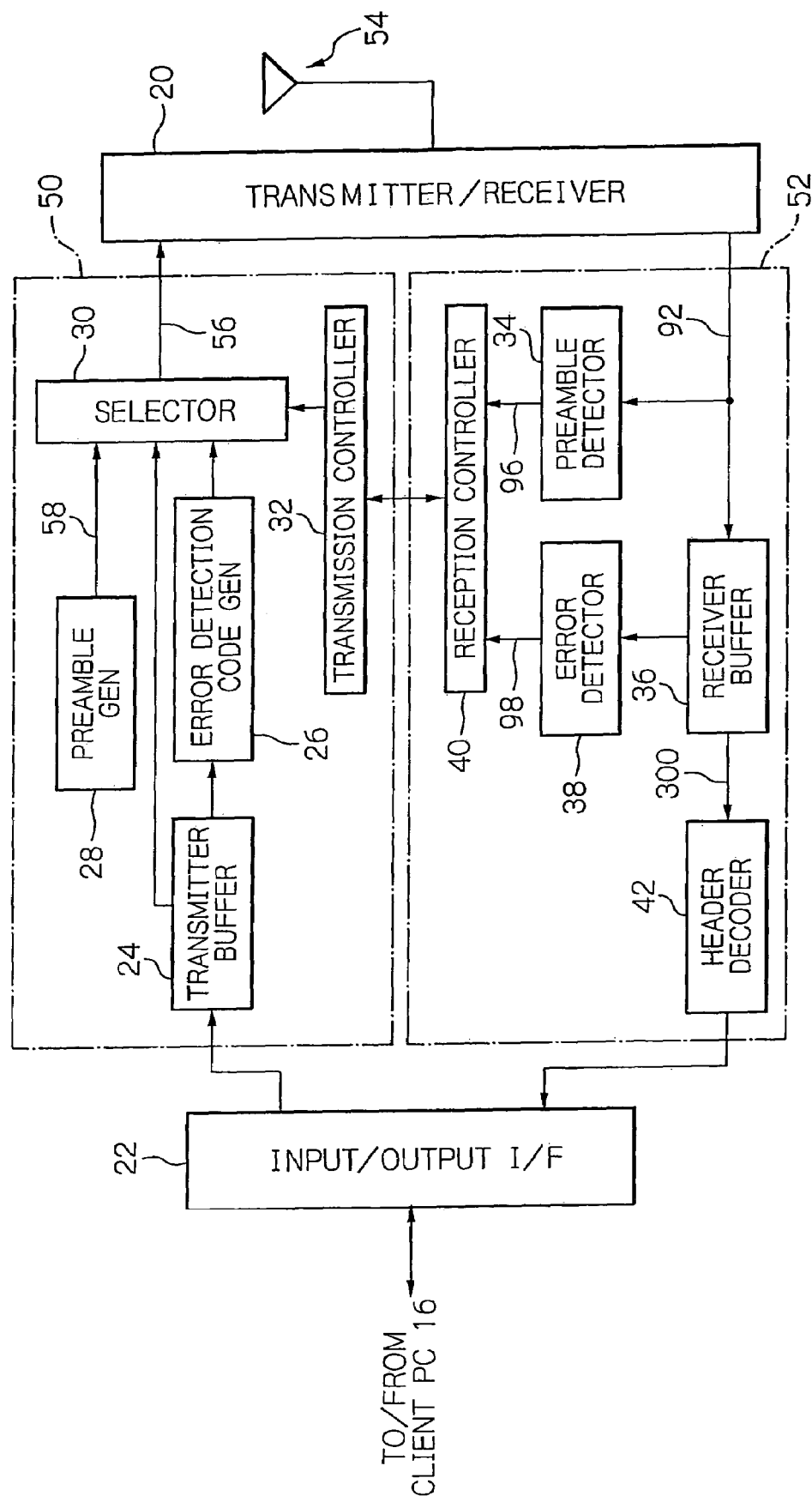
FIG. 2 is a functional block diagram showing the wireless communications apparatus according to the illustrative embodiment.

As shown in FIG. 2, a functional block diagram, one of the wireless communications apparatus, specifically 12, generally comprises a transmitting data generator 50 to generate data 56 to be transmitted, a received data processor 52 to process received data, an antenna 54, a transmitter/receiver 20 that provides the received data processor 52 with data received by the antenna 54 and causes the antenna 54 to transmit data generated by the transmitting data generator 50, and an input/output interface 22, which are interconnected as illustrated.

The transmitting data generator 50 is adapted to produce packet data 56 having its data format as shown in FIG. 3A. Specifically, the packet data 56 consist of a preamble field 58 to establish synchronization in transmission, a header field 80 that contains control information indicating the kind and the number of bits of data 88 to be transmitted, a transmitting information field 88 containing packet data to be transmitted, and an error detection code field 90 containing a kind of redundancy data, such as CRC (Cyclic Redundancy Check) code, for detecting error involved in the header 80 and transmitting information 88. The preamble field 58 has its pattern of bits known and consisting of a synchronous (SYNC) field 92 to establish bit synchronization and an SFD (Start Frame Delimiter) field 94 to establish frame synchronization. However, the specific data format 56 is merely illustrative, and may be designed in a different pattern from the above-mentioned pattern according to wireless communication standards or system structures.

The transmitting data generator 50 is composed of a transmitter buffer 24 that is adapted to temporarily store header information 80 and transmitting information 88 supplied from the input/output interface 22, an error detection code generator 26 that is adapted to generate an error detection code 90 from the header information 80 and transmitting information 88, a preamble generator 28 that is adapted to generate preamble information 58, a selector 30 that is adapted to select either one of the header information 80, transmitting information 88, error detection code 90 and preamble information 58 to output the selected one to the transmitter/receiver 20, and a transmission controller 32 that is adapted to control the order of data outputted from the selector 30, which are interconnected as illustrated.

The received data processor 52 is composed of a preamble detector 34 that is adapted to detect the preamble field 58 in data 92 supplied from the transmitter/receiver 20, a receiver buffer 36 that is adapted to temporarily store the data 92 supplied from the transmitter/receiver 20, an error detector 38 that is adapted to extract the error detection code 90, header information 80 and transmitting information 88 to use the error detection code 90 to detect a bit error in the header information 80 and transmitting information 88, a reception controller 40 that is adapted to control the operation on the received data 92 in response to signals 96 and 98 inputted from the preamble detector 34 and the error detector 38, respectively, and a header decoder 42 that is adapted to extract the header information 80 from the data 300 stored in the receiver buffer 36 to decode the header information 80. Those constituent elements are interconnected as illustrated in the figure. Signals are designated with reference numerals of the connections on which they are conveyed.

The preamble detector 34 is adapted for calculating the correlation value of the bit pattern of the received data 92 with a predetermined bit pattern for preamble information to determine whether or not the correlation value is equal to or larger than a predetermined threshold value. The preamble detector 34 is further adapted to use the correlation value thus calculated to decide a timing at which the packet data 92 are to be received.

The wireless communications apparatus 12 thus structured may be implemented by a microcomputer consisting of a CPU (Central Processor Unit), a RAM (Random-Access Memory) and a ROM (Read-Only Memory), etc., not specifically shown, so that the functional blocks described above are implemented by means of program sequences stored in the ROM. The program sequences include a packet data transmission routine and a packet data reception routine as will be described below. Both of preamble generator 28 and preamble detector 34 may however be implemented by hardware or circuitry dedicated therefor for the purpose of realizing high-speed processing, while both of the transmitter buffer 24 and receiver buffer 36 are implemented by a RAM type of storage.

Also, the other wireless communications apparatus 14, FIG. 1, has its system configuration the same as the one wireless communications apparatus 12. A detailed description thereon will therefore be omitted. As seen from FIG. 1, the input/output interface 22 of the wireless communications apparatus 12 is connected to the client personal computer 16, and the input/output interface 22 of the other wireless communications apparatus 14 is connected to the data processing server 18.

Further, the client personal computer 16 may be one which has its structure conventionally used for known personal computers. The data processing server 18 may be one which has its structure conventionally applied to servers. Therefore, the detailed description will be omitted on the ordinary operations of the client personal computer 16 and data processing server 18 in the embodiment.

Well, the operation of a wireless communications system 11 according to the illustrative embodiment of the invention will be described. For example, the client personal computer 16 will send out data to the data processing server 18 via the wireless communications system 11.

Figure 4:
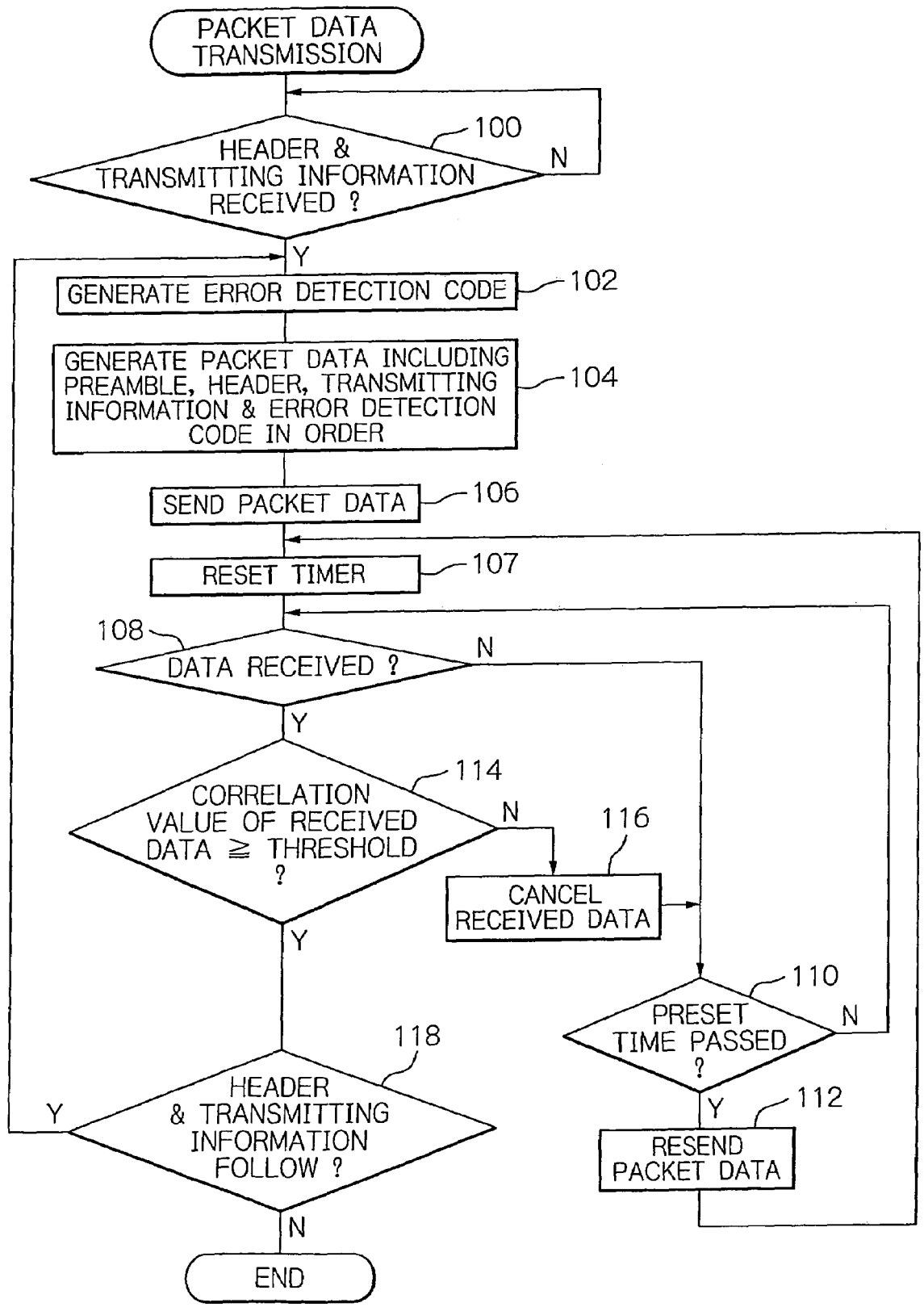
FIG. 4 is a flow chart useful for understanding a packet data transmission routine of the wireless communications apparatus according to the illustrative embodiment.

When the user instructs to transmit data produced by the client personal computer 16 to the data processing server 18, the produced data including the header information 80 and transmitting information 88 are inputted to the wireless communications apparatus 12, which in turn carries out a packet data transmission routine as shown in FIG. 4. First, in the step 100, it is determined whether or not the header information 80 and transmitting information 88 are inputted from the client personal computer 16. When the header information 80 and transmitting information 88 are inputted, the processing moves from the step 100 to the step 102, in which an error detection code 90 is generated based on the header information 80 and transmitting information 88. Consecutively, in the step 104, the packet data 56 are generated which consist of the preamble information 58 produced by the preamble generator 28, the header information 80, the transmitting information 88 and the error detection code 90 generated in the step 102, which are arranged in the order shown in FIG. 3A. In the step 106, the packet data 56 thus generated are sent out to the wireless communications apparatus 14. Then, in the step 107, a timer, not shown, is reset which is adapted to measure a period of time elapsing from the time when the packet data 56 are transmitted.

Figure 5:
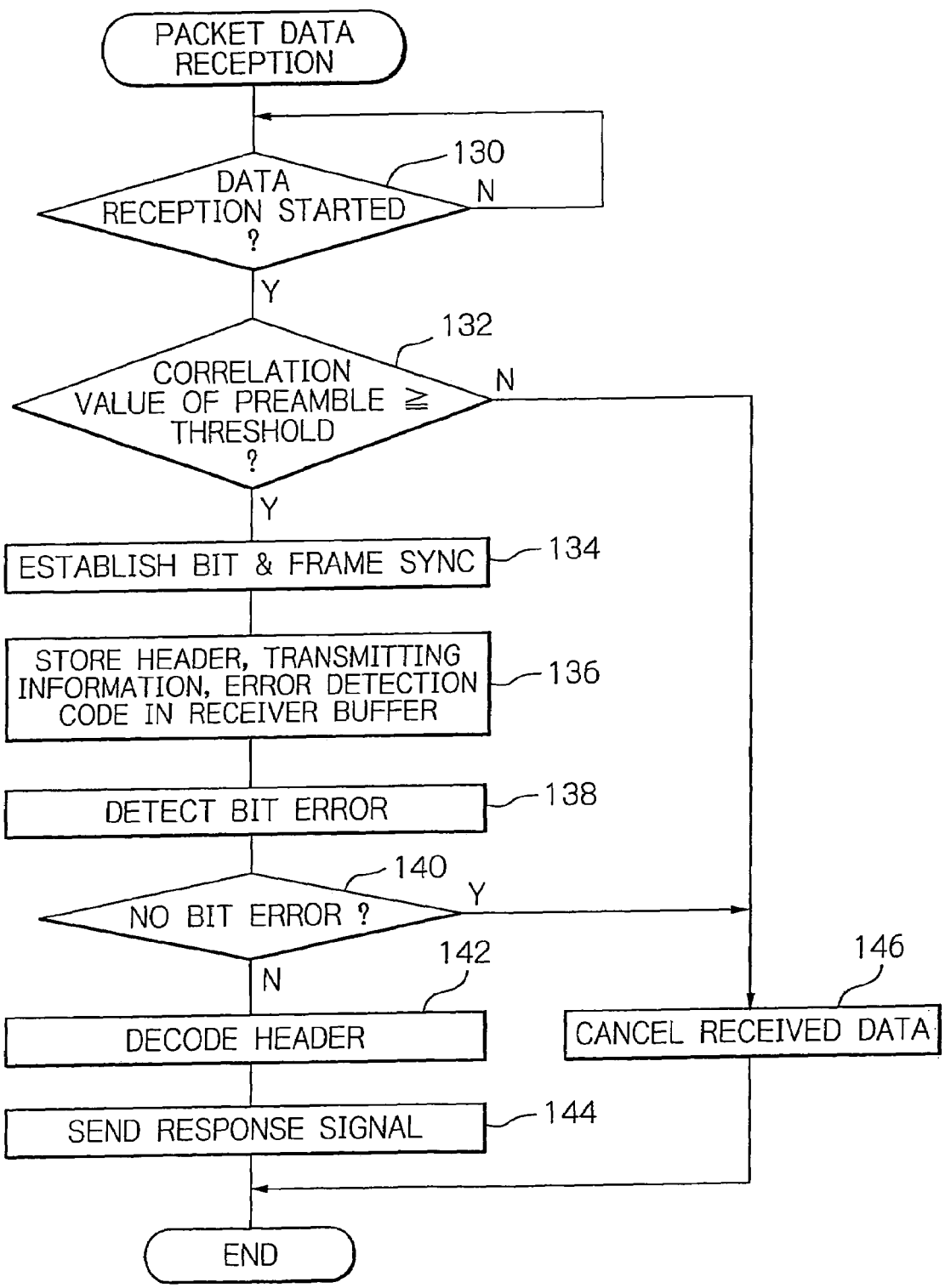
FIG. 5 is a flow chart, like FIG. 4, useful for understanding a packet data reception routine of the wireless communications apparatus according to the illustrative embodiment.

Next, a packet data reception routine shown in FIG. 5 will be carried out by the wireless communications apparatus 14. In the step 130, it is determined whether or not the reception of the data 56 sent from the wireless communications apparatus 12 is started. When the reception is started, the processing moves from the step 130 to the step 132, in which it is determined whether or not the correlation value of the preamble information data 58 included in the received data 92 with the predetermined preamble information is equal to or larger than the predetermined threshold value. When the correlation value calculated by the preamble detector 34 is equal to or larger than the predetermined threshold value, the SYNC information 92 and SFD information 99 of the preamble field 58 are detected by the preamble detector 34. Then, in the step 134, bit synchronization and frame synchronization are established based on the SYNC information 92 and SFD information 94, respectively. Consecutively, in the step 136, the header information 80, transmitting information 88 and error detection code 90 following the preamble information 80 included in the received packet data 56 are stored in the receiver buffer 36. Thereafter, the processing moves to the step 138.

By contrast, when the correlation value of the received data 92 with the predetermined preamble information is less than the predetermined threshold value, the decision in the step 132 goes to negative. Then, in the step 146, the received data 92 are cancelled, and the packet data reception routine ends.

In the step 138, an error detection code 90 is generated based on the header information 80 and transmitting information 88 stored in the receiver buffer 36. The error detection code 90 thus generated is then compared with the error detection code 90 stored in the receiver buffer 36 so as to detect a bit error in the received packet data 56. In turn, in the step 140, it is determined whether or not a bit error is detected. When the error detection code 90 generated in the step 138 is different from the error detection code 90 of the received packet data 56, the received data 92 are cancelled in the step 146 and the packet data reception routine ends. By contrast, when the error detection code 90 generated in the step 138 agrees with the error detection code 90 of the received packet data 56, the control proceeds to the step 142. Specifically, the header information 80 stored in the receiver buffer 36 is decoded, and the transmitting information 88 are transmitted to the data processing server 18 together with the decoded header information 80.

Then, in the step 144, the packet data 56*a* consisting of only the preamble information 58*a*, FIG. 3B, generated by the preamble generator 28 are sent out toward the wireless communications apparatus 12 as a response signal, and the packet data reception routine ends.

Now, returning to FIG. 4, in the step 108 of the packet data transmission routine carried out by the wireless communications apparatus 12, it is determined whether or not packet data have been received as a response signal sent from the wireless communications apparatus 14. When the decision is negative, it is determined in the step 110 whether or not the predetermined time period has past since the packet data 56 have been sent out in the step 106. If the time measured by the timer is less than the predetermined value, the processing returns to the step 108, and if it reaches the predetermined value, then the processing transfers to the step 112, where the packet data 56 sent in the step 106 will again be transmitted to the wireless communications apparatus 14. Thereafter, the processing returns to the step 107, where the timer is reset again.

By contrast, when packet data 56 have been received as a response signal sent out from the wireless communications apparatus 14, the determination in the step 108 is rendered positive. Then, in the step 114, it is determined whether or not the correlation value of the received data 92 with the predetermined preamble information is equal to or larger than the preset threshold value. When the correlation value calculated by preamble detector 34 is less than the preset threshold value, the determination in the step 108 is rendered negative, and the received data 92 are cancelled in the step 116. Thereafter, the processing moves to the step 110.

When the correlation value of the received data with the predetermined preamble information is equal to or larger than the preset threshold value, it is determined in the step 118 whether or not there exist the header information 80 and transmitting information 88 to be transmitted next. If such header information 80 and transmitting information 88 to be transmitted next have been received from the client personal computer 16, then the processing returns to the step 102 and the above-described processing will be repeated. If such next header information 80 and transmitting information 88 do not exist, then the packet data reception routine ends.

As described above, the wireless communications system according to the illustrative embodiment of the invention is adapted for resending packet data only when the correlation value of received data as a response signal with the predetermined preamble information is not larger than the threshold value, and not resending the packet data when the correlation value of the received data with the predetermined preamble information is equal to or larger than the threshold value even when the received data are of a response signal consisting of preamble information having a bit error incurred. It is therefore possible to control unnecessary resending and improve the transmission efficiency. Further, since packet data 56*a* consisting of only preamble information 58*a*, FIG. 3B, are sent-out as a response signal, it is possible to reduce the number of bits required for a response signal and to accomplish the same advantages as attained by transmitting an ACK packet.

Existent wireless communication apparatus is generally provided with a circuit for calculating a correlation value based on preamble information. Therefore, no additional structural modification is required. It is thus possible to apply the present invention cost-effectively to such existent wireless communication apparatus.

As described above, the illustrative embodiment is adapted to determine whether or not the correlation value of the received data with the predetermined preamble information is equal to or larger than a threshold value. The system may however be adapted for sending out packet data and thereafter expecting that other data except for a response signal will arrive to determine whether or not data when received are packet data 56*a* consisting of preamble information 58*a* alone. In this case, the system may be structures such that the amount of information of packet data 56 or 56*a* received is determined so as to determine whether or not the packet data 56 or 56*a* contain the header information 80, transmission information 88 and error detection code 90.

Now, an alternative embodiment of the invention will be described with reference to FIGS. 6-9. In FIGS. 6-9, like constituent elements are designated with the same reference numerals, and redundant description thereon will be omitted.

Figure 6:
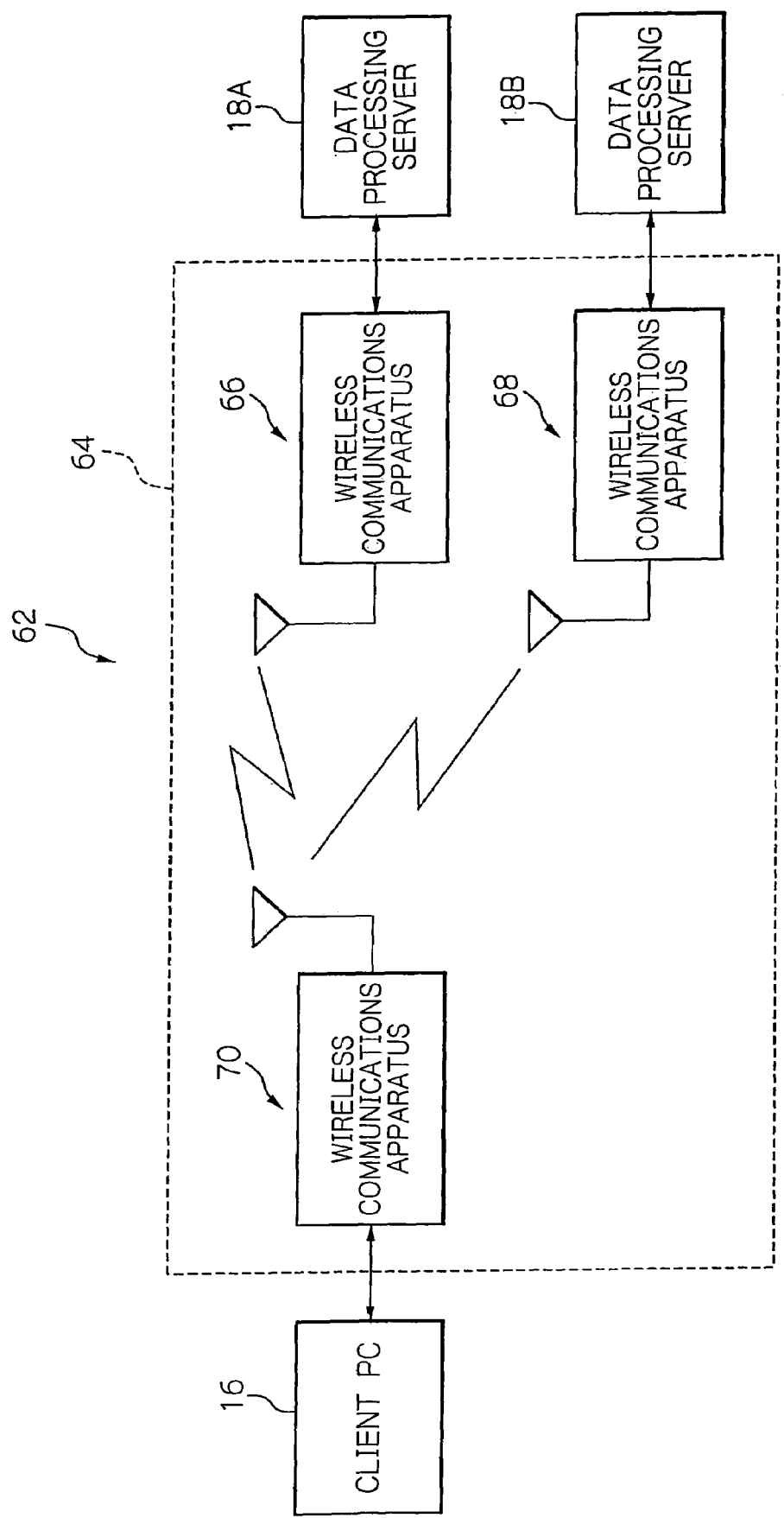
FIG. 6 is a schematic block diagram, like FIG. 1, showing the configuration of a wireless communications system according to an alternative embodiment of the invention.

As shown in FIG. 6, a data communications system 62 is composed of a wireless communications system 64, according to the alternative embodiment, which carries out wireless data communication. The data communications system 62 includes the client personal computer 16 as well as data processing servers 18A and 18B. Again, the specific system 62 is merely illustrative. In practice, the system 62 may of course be structured to include a lot of personal computers and servers corresponding to the client personal computer 16 and the data processing servers 18A and 18B.

The wireless communications system 64 is composed of wireless communications apparatus 66, 68 and 70, which may be of wireless LAN cards or routers, etc., adapted to transmit and receive data. The alternative embodiment is different from the embodiment shown in and described with reference to FIG. 1 in that three sets of wireless communications apparatus are provided. One of the wireless communications apparatus, i.e. 66, is connected to the data processing server 18A, and another of the wireless communications apparatus, i.e. 68, is connected to the data processing server 18B. The remaining wireless communications apparatus 70 is connected to the client personal computer 16.

Figure 7:
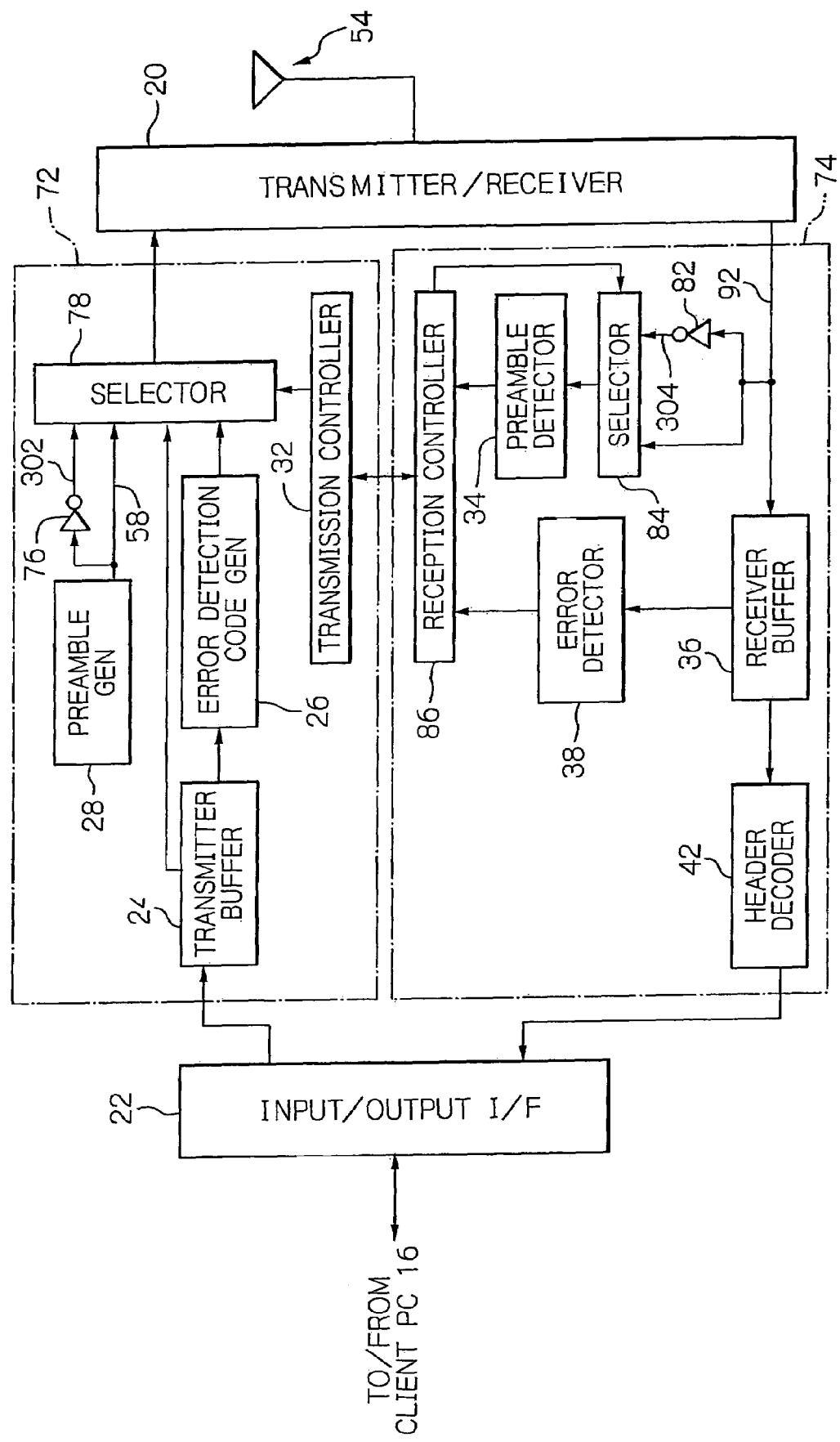
FIG. 7 is a functional block diagram, like FIG. 2, of the wireless communications apparatus according to the alternative embodiment.

Now with reference to FIG. 7, the wireless communications apparatus 70 includes a transmitting data generator 72, which is provided with an inverter 76 that is adapted to invert the data bits of the preamble field 58 generated by the preamble generator 28. The inverter 76 has its output 302 supplied to a selector 78. The received data processor 74 is provided with an inverter 82 that is adapted to invert the data bits of the received data 92, and a selector 84 for selecting either one of the received data 304 having the data bits thereof inverted by the inverter 82 and the received data 92 whose data bits not inverted to supply the selected data to the preamble detector 34. Further, a reception controller 86 is provided to control the selector 84 to select data to be outputted therefrom.

The other functional blocks may be the same as those of the illustrative embodiment shown in FIG. 2. The wireless communications apparatus 66 and 68 have the same configuration as that of the wireless communications apparatus 70.

Figure 8:
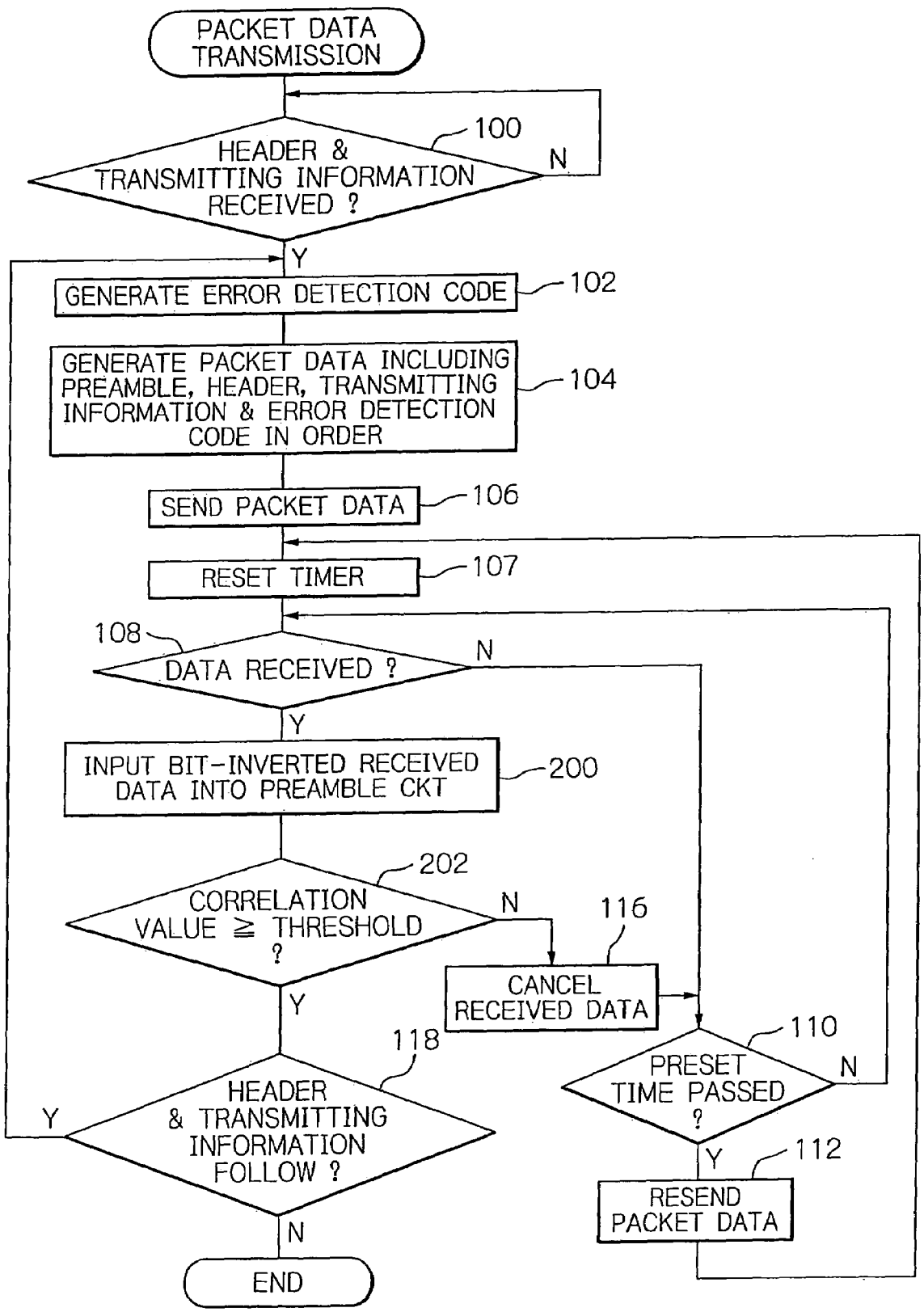
FIG. 8 is a flow chart, like FIG. 4, useful for understanding a packet data transmission routine of the wireless communications apparatus according to the alternative embodiment.

Next, a packet data transmission routine controlling the wireless communications apparatus 70 will be described with reference to FIG. 8 according to the alternative embodiment of the invention. In FIG. 8, the same steps as the illustrative embodiment shown in FIG. 2 are depicted again with the same reference numerals added, and redundant description thereon may be omitted.

First, in the step 100, it is determined whether or not the header information 80 and transmitting information 88 are provided from the client personal computer 16. Then, in the step 102, an error detection code 90 is generated based on the header information 80 and transmitting information 88, if provided. Consecutively, in the step 104, the packet data are generated which consist of the preamble information 58 generated by the preamble generator 28, the header information 80, the transmitting information 88 and the error detection code 90 generated in the step 102 which are arranged in this order. In the step 106, the packet data 56 thus generated are sent out to the wireless communications apparatus 66 connected to the data processing server 18A. Then, in the step 107, the timer is reset.

Figure 9:
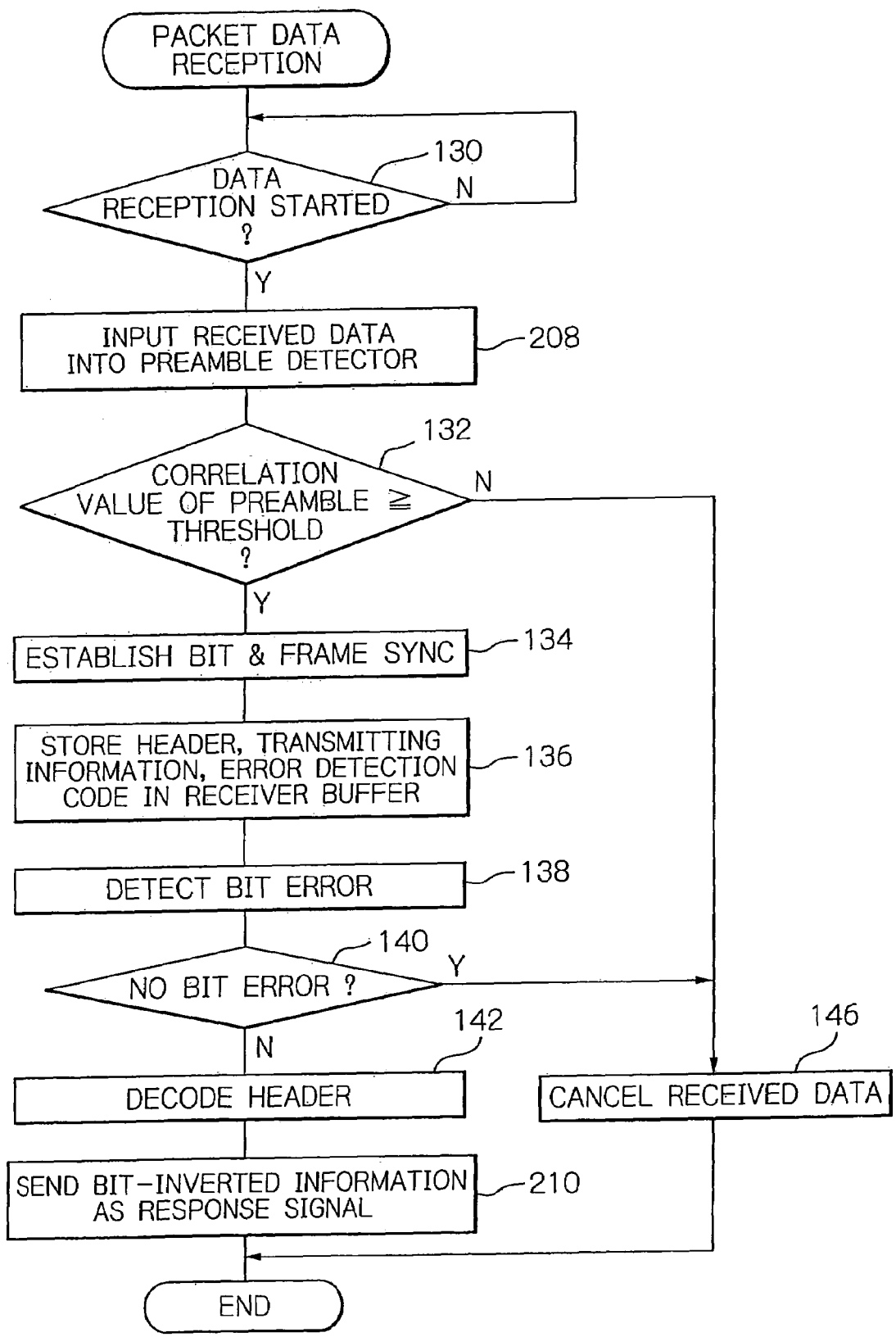
FIG. 9 is a flow chart, like FIG. 5, showing a packet data reception routine of the wireless communications apparatus according to the alternative embodiment.

Next, the packet data reception routine as shown in FIG. 9 will be carried out by the wireless communications apparatus 66 connected to the data processing server 18A. In the step 130, it is determined whether or not the reception of data is started. Then, in the step 208, the preamble information data 58 included the received data 92 are inputted into the preamble detector 34. In the step 132, it is determined whether or not the correlation value of the preamble information 58 data included in the received data 92 with the predetermined preamble information is equal to or larger than the preset threshold value. When the correlation value calculated by the preamble detector 34 is equal to or larger than the preset threshold value, the control transfers to the step 134, in which bit synchronization and frame synchronization are established based on the SYNC information 92 and SFD information 94 of the preamble information 58, respectively. Consecutively, in the step 136, the header information 80, transmitting information 88 and error detection code 90 following the preamble information 58 included in the received packet data 92 are stored in the receiver buffer 36. After that, the processing moves to the step 138.

Well, when the correlation value of the preamble information data 58 included in the received data 92 with the predetermined preamble information is less than the preset threshold value, the determination in the step 132 is rendered negative. In the step 146, then, the received data 92 are cancelled and the packet data reception routine will be finished.

In the step 138, an bit error detection is proceeded by the received packet data 92. Then, in the step 140, it is determined whether or not a bit error is detected. When any error is detected, the received data 92 are cancelled in the step 146, and the packet data reception routine ends. When no error is detected, the header information 80 stored in the receiver buffer 36 is decoded in the step 142, and the transmitting information 88 is transmitted to the data processing server 18 together with the decoded header information 80. Then, in the step 210, a response signal 56a consisting of only the preamble information 58a which have the data bits 302 thereof generated by the preamble generator 28 and inverted by the inverter 76 is sent out to the wireless communications apparatus 70, and the packet data reception routine ends.

In the step 108 of packet data transmission routine shown in FIG. 8 carried out by the wireless communications apparatus 70, it is determined whether or not data sent from the wireless communications apparatus 66 or 68 have been received. When the decision is negative, it is determined in the step 110 whether or not the preset time has past after having sent the packet data 58 in the step 106. When the time counted by the timer is less than the preset time value, the processing returns to the step 108. The count in the timer is more than the preset time value, the processing moves to the step 112, where the packet data 56 already sent in the step 106 will be transmitted again to the wireless communications apparatus 66 connected to the data processing server 18A. After that, the processing returns to the step 107, where the timer is reset again.

By contrast, when the data 56 sent from the wireless communications apparatus 66 or 68 have been received, the determination in the step 108 is rendered positive. Then, in the step 200, the received data 92 whose have the data bits thereof inverted are inputted into the preamble detector 34. In the step 202, it is determined whether or not the correlation value of the received data 92 whose data bits 304 are inverted with the predetermined preamble information is equal to or larger than the preset threshold value. If it is determined that the received data 92 are packet data different from an expected response signal sent from the wireless communications apparatus 66, then the received data are cancelled in the step 116. The processing moves to the step 110.

When the correlation value of the received data 92 which have the data bits 304 thereof inverted and the predetermined preamble information is equal to or larger than the preset threshold value, it is determined that the response signal has been received. Then, in the step 118, it is determined whether or not there are the header information 80 and transmitting information 88 to be transmitted next. When such header information 80 and transmitting information 88 to be transmitted next have been provided from client personal computer 16, the processing returns to the step 102, and the above-described processing repeats itself. If such header information 80 and transmitting information 88 to be transmitted next do not exist, then the packet data reception routine ends.

As described above, the wireless communications system according to the alternative embodiment of the invention is adapted for resending packet data 56 only when the correlation value of received data 92 which have the data bits 304 thereof inverted and the predetermined preamble information is not larger than the threshold value. The wireless communications system fails to resend packet data 56 when the correlation value of the received data 92 which have the data bits thereof 304 inverted and the predetermined preamble signal is equal to or larger than the threshold value even when the received data 92 have a bit error and a response signal received consists of the preamble information data which have the data bits thereof inverted. It is therefore possible to control unnecessary resending and improve the transmission efficiency.

Further, packet data 56a are transmitted which consist of only the preamble information data 58a which have the data bits thereof inverted. It is therefore possible to reduce the number of bits required for a response signal. In addition, the preamble information 56a which have the data bits 304 thereof inverted is used as a response signal. It is therefore possible to determine whether or not a signal received is a response signal, without increasing the number of bits required for a response signal, even when packet data are received which include preamble information but are not a response signal (or data sent from the wireless communications apparatus 68 with the alternative embodiment) together with a response signal consisting of only preamble information data which have the data bits thereof inverted (or data sent from the wireless communications apparatus 66 with the alternative embodiment).

Existent wireless communication apparatus is generally provided with a circuit for calculating a correlation value of received data with preamble information. Therefore, a circuit for inverting data bits is merely added to make it possible to apply the present invention cost-effectively to such existent wireless communication apparatus.

The entire disclosure of Japanese patent application No. 2005-005943 filed on Jan. 13, 2005, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A wireless communications system comprising first and second wireless communications apparatus connectable over a network, wherein
said first wireless communications apparatus comprises:
a first transmitter/receiver for transmitting packet data including either preamble information and an error detection code or only the preamble information to said second wireless communications apparatus, and receiving data transmitted from said second wireless communications apparatus;
a first determination circuit for calculating a first correlation value of the data received by said first transmitter/receiver with first predetermined preamble information, and determining whether or not the first correlation value is equal to or larger than a first threshold value; and
a controller for controlling said first transmitter/receiver to retransmit the packet data including the preamble information and the error detection code when the determination circuit fails to determine that the correlation value is equal to or larger than the first threshold value in a first predetermined period of time after having transmitted the packet data including the preamble information and the error detection code,
said second wireless communications apparatus comprising:
a second transmitter/receiver for transmitting packet data including either the preamble information and the error detection code or only the preamble information to said first wireless communications apparatus, and receiving data transmitted from said first wireless communications apparatus;
a second determination circuit for calculating a second correlation value of the data received by said second transmitter/receiver with a second predetermined preamble information, and determining whether or not the second correlation value is equal to or larger than a second threshold value; and a second controller for controlling said second transmitter/receiver to retransmit the packet data including the preamble information and the error detection code when said second determination circuit fails to determine that the second correlation value is equal to or larger than the second threshold value in the second predetermined period of time after having transmitted the packet data including the preamble information and the error detection code.

2. A wireless communications apparatus comprising:

an inverter for inverting data bits;

a transmitter/receiver for transmitting packet data including either preamble information and an error detection code or only information resultant from inverting the preamble information by said inverter to another wireless communications apparatus, and receiving data transmitted from the other wireless communications apparatus;

a selector for selecting either data resultant from inverting the received data by said inverter or the received data not inverted;

a determination circuit for calculating a correlation value of the data selected by said selector with predetermined preamble information, and determining whether or not the correlation value is equal to or larger than a threshold value, and a controller for controlling said selector to select the inverted data after having transmitted the packet data including the preamble information and the error detection code, said controller controlling said transmitter/receiver to retransmit the packet data including the preamble information and the error detection code when said determination circuit fails to determine that the correlation value is equal to or larger than the threshold value in a predetermined period of time after having transmitted the packet data, said controller controlling said selector to select the data not inverted after said determination circuit determines that the correlation value is equal to or larger than the threshold value.

3. The apparatus as claimed in claim 2, further comprising an error detector for detecting error on a basis of the error detection code when said determination circuit determines that the correlation value is equal to or larger than the threshold value and the packet data includes the error detection code, said controller controlling said transmitter/receiver to transmit the packet data including only the information resultant from inverting the preamble information by said inverter as a response signal when no error is detected by said error detector.

4. A wireless communications system comprising first and second wireless communications apparatus connectable over a network, wherein said first wireless communications apparatus comprises:

a first inverter for inverting data bits;

a first transmitter/receiver for transmitting packet data including either preamble information and an error detection code or only information resultant from inverting the preamble information by said first inverter to said second wireless communications apparatus, and receiving data transmitted from said second wireless communications apparatus;

a first selector for selecting either data resultant from inverting the received data by said first inverter or the received data not inverted;

a first determination circuit for calculating a first correlation value of the data selected by said first selector with first predetermined preamble information, and determining whether or not the first correlation value is equal to or larger than a first threshold value, and a first controller for controlling said first selector to select the inverted data after having transmitted the packet data including the preamble information and the error detection code, said first controller controlling said first transmitter/receiver to retransmit the packet data including the preamble information and the error detection code when said first determination circuit fails to determine that the first correlation value is equal to or larger than the first threshold value in a first predetermined period of time after having transmitted the packet data, said first controller controlling said first selector to select the data not inverted after said first determination circuit determines that the first correlation value is equal to or larger than the first threshold value, said second wireless communications apparatus comprising:

a second inverter for inverting data bits;

a second transmitter/receiver for transmitting packet data including the preamble information and the error detection code or only information resultant from inverting the preamble information by said second inverter to said first wireless communications apparatus, and receiving data transmitted from said first wireless communications apparatus;

a second selector for selecting either data resultant from inverting the received data by said second inverter or the received data not inverted;

a second determination circuit for calculating a second correlation value of the data selected by said selector with second predetermined preamble information, and determining whether or not the second correlation value is equal to or larger than a second threshold value; and a second controller for controlling said second selector to select the inverted data after having transmitted the packet data including the preamble information and the error detection code, said second controller controlling said second transmitter/receiver to retransmit the packet data including the preamble information and the error detection code when said second determination circuit fails to determine that the second correlation value is equal to or larger than the second threshold value in a second predetermined period of time after having transmitted the packet data, said second controller controlling said second selector to select the data not inverted after said second determination circuit determines that the second correlation value is equal to or larger than the second threshold value.

* * * * *